US010926803B2

(12) United States Patent
Moss et al.

(10) Patent No.: US 10,926,803 B2
(45) Date of Patent: Feb. 23, 2021

(54) FOUR RAIL FRONT CRUSH STRUCTURE WITH LOAD DISSEMINATION INTO EIGHT ELEMENT SUPPORT STRUCTURE

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Peter M. Parlow, Columbus, MI (US); Keith J. Saari, Macomb Township, MI (US); Joshua Holder, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 41 days.

(21) Appl. No.: 16/514,529

(22) Filed: Jul. 17, 2019

(65) Prior Publication Data

US 2021/0016835 A1    Jan. 21, 2021

(51) Int. Cl.
*B60K 5/00* (2006.01)
*B62D 21/15* (2006.01)
*B62D 21/04* (2006.01)

(52) U.S. Cl.
CPC .............. *B62D 21/155* (2013.01); *B60K 5/00* (2013.01); *B62D 21/04* (2013.01); *B60K 2005/003* (2013.01)

(58) Field of Classification Search
CPC ........ B62D 21/155; B62D 21/04; B60K 5/00; B60K 2005/003
USPC .................................................... 296/187.03
See application file for complete search history.

(56) References Cited

U.S. PATENT DOCUMENTS

| | | | | |
|---|---|---|---|---|
| 1,484,474 A | * | 2/1924 | Cross ....................... | B60K 5/00 180/68.1 |
| 5,074,587 A | * | 12/1991 | Schwede ................ | B62D 21/00 280/781 |
| 5,660,428 A | * | 8/1997 | Catlin .................... | B62D 21/04 269/311 |

(Continued)

FOREIGN PATENT DOCUMENTS

| | | | | |
|---|---|---|---|---|
| JP | 2015101226 A | * | 6/2015 | |
| JP | 2017124657 A | * | 7/2017 | ........... B62D 21/155 |
| WO | WO-9741010 A1 | * | 11/1997 | ........... B62D 23/005 |

*Primary Examiner* — Pinel E Romain
(74) *Attorney, Agent, or Firm* — Quinn IP Law

(57) ABSTRACT

A system for providing structural transmittal of force through a vehicle body of a mid-engine vehicle is provided. The system includes an elongated single member torsional box spanning a passenger compartment. The system further includes two vehicle body side members spanning an outer lateral edge of the passenger compartment. The system further includes four rails parallel to the longitudinal axis of the vehicle body. The system further includes four inner diagonal support members, each inner diagonal support member being connected at a first end to one of the four rails and on the second end to the elongated single member torsional box and being configured to transmit force from the one of the four rails to the single member torsional box. The system further includes four outer diagonal support members, each outer diagonal support member being configured to transmit force to one of the vehicle body side members.

16 Claims, 8 Drawing Sheets

(56) References Cited

U.S. PATENT DOCUMENTS

| | | | | |
|---|---|---|---|---|
| 7,114,764 | B1* | 10/2006 | Barsoum | B60R 19/00 296/193.07 |
| 8,764,104 | B2* | 7/2014 | Kihara | B60R 19/34 296/193.09 |
| 9,067,627 | B2* | 6/2015 | Hara | B62D 21/152 |
| 9,216,768 | B1* | 12/2015 | Dressel | B62D 25/082 |
| 9,592,856 | B2* | 3/2017 | Nakamura | B62D 25/06 |
| 9,834,160 | B2* | 12/2017 | Staines | B60R 19/023 |
| 9,988,091 | B2* | 6/2018 | McConnell | B62D 21/02 |
| 9,988,100 | B2* | 6/2018 | Kim | B62D 25/082 |
| 10,005,349 | B2* | 6/2018 | Baccouche | B62D 25/087 |
| 10,086,875 | B2* | 10/2018 | Nishikawa | B62D 21/155 |
| 10,150,509 | B2* | 12/2018 | McConnell | B62D 21/155 |
| 2006/0273628 | A1* | 12/2006 | Wolkersdorfer | B62D 25/04 296/193.02 |
| 2012/0175863 | A1* | 7/2012 | Theodore | B62D 21/04 280/798 |
| 2013/0249244 | A1* | 9/2013 | Cassaday | F41H 7/042 296/187.08 |
| 2016/0207570 | A1* | 7/2016 | Tanaka | B60G 3/20 |

* cited by examiner

FOUR RAIL FRONT CRUSH STRUCTURE WITH LOAD DISSEMINATION INTO EIGHT ELEMENT SUPPORT STRUCTURE

INTRODUCTION

The disclosure generally relates to a structural system for a convertible, mid-engine automobile.

A vehicle body includes a structural system useful for providing rigidity and force transmission through the body. The structural system includes a group of connected structural members which are frequently shaped tubular members, which can include a wide variety of cross-sectional shapes.

A structural system in a convertible vehicle is complex, in that structural members that are present in a roof of a standard coupe vehicle are absent in a convertible. Further, one does not typically want a majority of force transmission in a vehicle to go through the vehicle doors.

A structural system in a mid-engine automobile is complex. A mid-engine automobile includes an engine behind the passenger compartment. As a result, the area in front of the passenger compartment is an empty space, which can include, for example, a cargo area. Mid-engine vehicle configurations limit efficient transfer of front external loads into mid vehicle structural members. Whereas front-engine vehicles have a large mass of the engine in front of the passenger compartment through which to transmit force, the empty space in front of the passenger compartment in a mid-engine automobile poses complex issues in terms of structural force transmission.

SUMMARY

A system for providing structural transmittal of force through a vehicle body of a mid-engine vehicle is provided. The system includes an elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body. The system further includes two vehicle body side members parallel to the longitudinal axis of the vehicle body and spanning an outer lateral edge of the passenger compartment from the vehicle-forward portion of the passenger compartment to the vehicle-rearward portion of the passenger compartment. The system further includes four rails in a vehicle-forward position relative to the elongated single member torsional box, parallel to the longitudinal axis of the vehicle body, and offset from the elongated single member torsional box. The system further includes eight diagonal support members. The eight diagonal support members include four inner diagonal support members, each inner diagonal support member being connected at a first end to one of the four rails and on the second end to the elongated single member torsional box and being configured to transmit force from the one of the four rails to the single member torsional box. The eight diagonal support members further include four outer diagonal support members, each outer diagonal support member being configured to transmit force to one of the vehicle body side members.

In some embodiments, the four rails are each constructed with a relatively low strength aluminum, and the four inner diagonal support members are each constructed with a relatively high strength aluminum. In some embodiments, the four outer diagonal support members are each constructed with aluminum of relatively higher strength than the relatively low strength aluminum of the four rails and of relatively lower strength than the relatively high strength aluminum of the four inner diagonal support members.

In some embodiments, the elongated single member torsional box includes a constant cross section along a longitudinal axis of the elongated single member torsional box.

In some embodiments, the inner diagonal support members are each oriented thirty degrees from the longitudinal axis of the vehicle body.

In some embodiments, the elongated single member torsional box includes four corners, and the inner diagonal support members are each connected at the second end to one of the corners of the elongated single member torsional box. In some embodiments, each of the corners of the elongated single member elongated box includes an elongated enclosed section running along an entire length of the elongated single member torsional box.

In some embodiments, the outer diagonal support members are each connected to one of the four rails.

In some embodiments, at least one the outer diagonal support members is connected to one of the inner diagonal support members in a vehicle-rearward location as compared to the first end of the inner diagonal support member. In some embodiments, each of the outer diagonal support members are connected to one of the inner diagonal support members in a vehicle-rearward location as compared to the first end of the inner diagonal support member.

In some embodiments, the system further includes vehicle body members positioned between the inner diagonal support members and the outer diagonal support members, and force is transmitted from the inner diagonal support members to the outer diagonal support members through the vehicle body members.

According to one alternative embodiment, a system for providing structural transmittal of force through a vehicle body of a mid-engine vehicle is provided. The system includes an elongated single member torsional box including four corners and spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body. The system further includes two vehicle body side members parallel to the longitudinal axis of the vehicle body and spanning an outer lateral edge of the passenger compartment from the vehicle-forward portion of the passenger compartment to the vehicle-rearward portion of the passenger compartment. The system further includes four rails in a vehicle-forward position relative to the elongated single member torsional box, parallel to the longitudinal axis of the vehicle body, and offset from the elongated single member torsional box. The system further includes eight diagonal support members. The eight diagonal support members include four inner diagonal support members, each inner diagonal support member being connected at a first end to one of the four rails and on the second end to the elongated single member torsional box and being configured to transmit force from the one of the four rails to the single member torsional box. The eight diagonal support members further include four outer diagonal support members, each outer diagonal support member being configured to transmit force to one of the vehicle body side members. The inner diagonal support members are each connected at the second end to a corner of the elongated single member torsional box, and each of the corners of the elongated single member elongated box includes an elongated enclosed section running along an entire length of the single member torsional box.

In some embodiments, at least one the outer diagonal support members is connected to one of the inner diagonal support members in a vehicle-rearward location as compared to the first end of the inner diagonal support member. In some embodiments, each of the outer diagonal support members are connected to one of the inner diagonal support members in a vehicle-rearward location as compared to the first end of the inner diagonal support member.

According to one alternative embodiment, a method for providing structural transmittal of a frontal force through a vehicle body of a mid-engine vehicle is provided. The method includes receiving the frontal force to four rails in a vehicle-forward position, the rails being oriented parallel to a longitudinal axis of the vehicle body. The method further includes transmitting the frontal force from the four rails to four inner diagonal support members located in a vehicle rearward position relative to the four rails, each of the inner diagonal support members being connected at a first end to one of the four rails and at a second end to an elongated single member torsional box, and additionally to four outer diagonal support members, each of the outer diagonal support members being configured to transfer force to a vehicle body side member parallel to the longitudinal axis of the vehicle body and spanning an outer lateral edge of a passenger compartment from a vehicle-forward portion of the passenger compartment to a vehicle-rearward portion of the passenger compartment. The method further includes transmitting the frontal force from the four inner diagonal support members to the elongated single member torsional box located in a vehicle rearward position relative to the four diagonal support members, the elongated single member torsional box spanning a passenger compartment from a vehicle-forward portion of the passenger compartment to a vehicle-rearward portion of the passenger compartment and being parallel to the longitudinal axis of the vehicle body and laterally centered upon a longitudinal centerline of the vehicle body.

In some embodiments, the method further includes connecting the four rails in the vehicle-forward position with horizontal members and at least one vertical brace to distribute the frontal force over the four rails.

The above features and advantages and other features and advantages of the present disclosure are readily apparent from the following detailed description of the best modes for carrying out the disclosure when taken in connection with the accompanying drawings.

DETAILED DESCRIPTION

Figure 1:
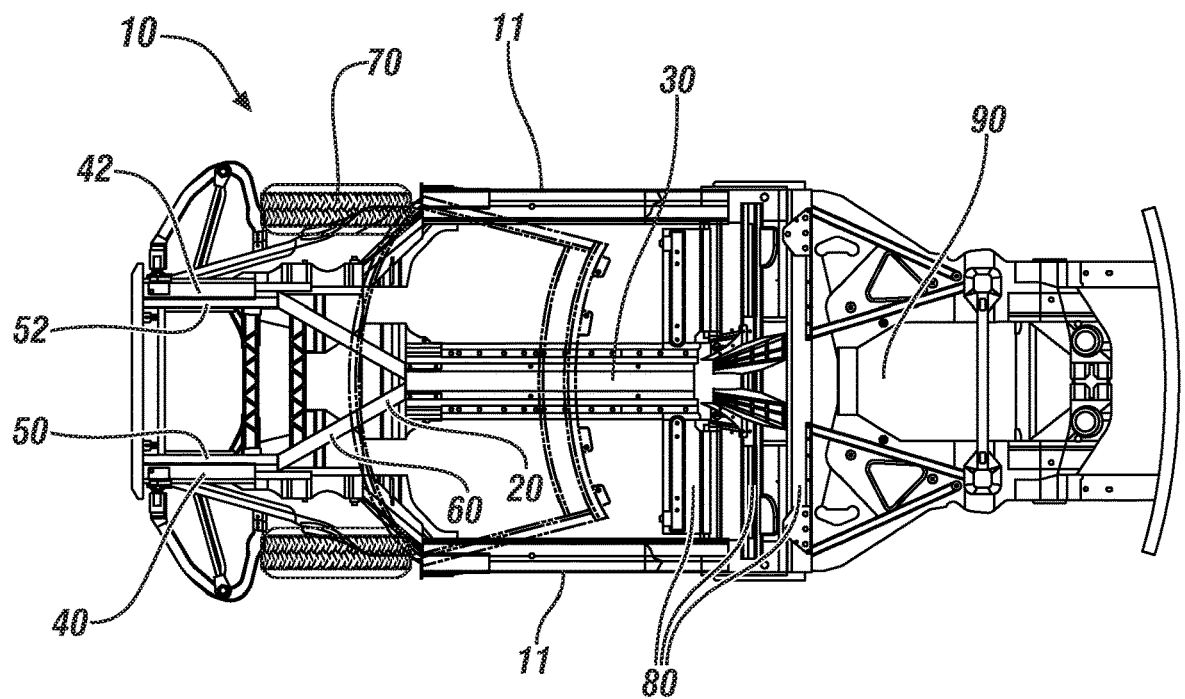
FIG. 1 illustrates in top view an exemplary vehicle body for a convertible mid-engine automobile, including a close coupled four rail front crush structure system, in accordance with the present disclosure.

A close coupled four rail front crush structure system is provided for a mid-engine vehicle. The system can be utilized in a mid-engine, convertible vehicle. According to one exemplary embodiment, the system includes a close coupled four rail system, including front upper and lower rails, both designed to maximize efficient transfer of front compression loads into an elongated single center torsional member. Both upper and lower rail systems may be positioned close to a vehicle centerline to minimize the angle of transition to the closed sections center tunnel. Additionally, the upper and lower rails may be designed in a horizontal plane such that the transition to the center tunnel member creates minimal vertical plane offset to ensure the transition of axial crush loads.

Four close coupled front rail members may each be joined to a low plan view angle diagonal structural element for efficient compressive load transfer into a single center torsion/compression structural member or single member torsional box. This single member torsional box can be described as a mid-vehicle tunnel dominant structure. This single member torsional box may sit between a driver seat and a passenger seat in the passenger compartment. A bottom surface of the single member torsional box can be flush or nearly flush with a bottom surface of the vehicle. In one embodiment, a bottom surface of the single member torsional box may be embodied as a flat panel and may be removeable, for example, with a plurality of fastening members, enabling maintenance service to components housed within the single member torsional box. The single member torsional box may, in some embodiments, be described as a singular, center torsional box structure, with a removal panel, augmented with continuous full-length closed section members at each corner to enable dual load carrying capability. In one embodiment, the single member torsional box can include a tunnel extrusion and/or stamping member with integrated clinch nuts.

In one embodiment, the four front rail members can be high integrity die castings made with low strength aluminum. In one embodiment, the four diagonal support members attached to the four front rail members can be extruded high strength aluminum. The four diagonal support members can be directly attached to four corners of the single member torsional box. Such a configuration may enable efficient transfer of load from front crush box, to front diagonals, and into the single member torsional box.

The front structure is an improvement over typical front structures for its configuration and efficiency in the method in which it transfers compressive load to the mid structure. The front crush structure and a back-up transition structure may be a combination of extrusions and castings (nodes) abbreviated as node-ex construction. The front crush zone extrusions may be constructed of crushable aluminum alloys, the diagonal structural elements may be high strength specialized 7000 series extrusions to facilitate the transfer of heavy compressive loads.

The single member torsional box may be dual purpose in load carrying capability; the large enclosed section providing high torsional rigidity, and the four corner box sections providing frontal compressive force strength. The large enclosed section may be additionally useful with its removable lower panel, for example, constructed with carbon fiber with an exemplary 28 attachments, ensuring torsional rigidity. The four corner box sections are useful in two exemplary ways; the upper sections are constructed with a single two cell extrusion with a connecting rib, the lower section constructed of an extrusion and a stamping with 14 embedded clinch nuts per tunnel side.

The system can include a high and low front rail system, combined with diagonal structural elements, aligned in a manner to transfer load into a single member torsional box with no vertical plane eccentricity.

Advantages of the disclosed system include improved open-air vehicle torsional stiffness, efficient distribution and mitigation of frontal force transmission loads, as well as, providing a higher priority of packaging real estate to occupants, powertrain systems, chassis systems, cooling systems, etc.

Typical vehicles include heat exchanger components located upon a front and center location in a vehicle. The disclosed four rail system may, in some embodiments, include a horizontal structural member spanning a front and center location between two top rails or two bottom rails. As a result, in some embodiments, radiators, condensers, charge air coolers, transmission coolers, etc., may be utilized outside of the font and center location, for example, in a dual outboard system where heat exchangers are moved in front of front wheel locations.

It will be appreciated that cooling lines, air conditioner fluid lines, etc., need to span from the mid-engine location behind the passenger compartment to the front-end locations of the heat exchangers utilized in the dual outboard system. These cooling and air conditioning fluid lines can run through the single member torsional box from the mid-engine location to the front-end location and back again through the single member torsional box to the mid-engine location.

The illustrated chassis system, steering, and suspension are balanced to allow non-eccentricity in a vertical plane.

The single member torsional box spans a center portion of the passenger compartment. As a result, a height of the single member torsional box may be dictated or impacted by seating height position and occupant ergonomics. Similarly, a width of the single member torsional box may be dictated or impacted by cross car seating position driven by occupant parameters The single member torsional box is preferably a closed cross-section structure, for example, with a rectangular, quadrilateral, or other closed geometrical cross section, which can act as a column in a horizontal orientation or set on its side. If the cross-section were instead open or U-shaped, a crush strength of the single member torsional box would be lessened. The single member torsional box may be a single or constant cross section along its longitudinal length, maximizing strength of the single member torsional box in transferring force in a longitudinal in-vehicle orientation by avoiding weak points that would be caused by necking or substantially thinning the single member torsional box. The complete closed cross section of the single member torsional box may, in one embodiment, be created by forming an upside-down U-shaped upper portion and adding a "close-out" panel or bottom portion to complete a rectangular cross-section. The upside-down U-shaped upper portion of the single member torsional box may be constructed through extrusion constructed with two continuous full-length closed sections.

FIG. 1 illustrates in top view an exemplary vehicle body for a convertible mid-engine automobile, including a close coupled four rail front crush structure system. Vehicle body 10 is illustrated including front crush structure system 20 connected to rearward body components 80. Vehicle body 10 further includes engine area 90. Front crush structure system 20 includes four rails including driver-side upper rail 40, passenger-side upper rail 42, driver-side lower rail 50, and passenger-side lower rail 52; diagonal support members 60; and single member torsional box 30. Each of driver-side upper rail 40, passenger-side upper rail 42, driver-side lower rail 50, and passenger-side lower rail 52 are parallel to a longitudinal axis of vehicle body 10, such that external force applied to a front of vehicle body 10 can be transmitted through driver-side upper rail 40, passenger-side upper rail 42, driver-side lower rail 50, and passenger-side lower rail 52 in a vehicle rearward direction. Each of driver-side upper rail 40, passenger-side upper rail 42, driver-side lower rail 50, and passenger-side lower rail 52 can be constructed of low strength aluminum, such that the rails can crush and absorb force.

Single member torsional box 30 is illustrated in a central portion of vehicle body 10 corresponding to a passenger compartment of vehicle body 10. Diagonal support members 60 are illustrated, one connected to each of driver-side upper rail 40, passenger-side upper rail 42, driver-side lower rail 50, and passenger-side lower rail 52, and each diagonal support member 60 being attached to a corner of single member torsional box 30.

Wheels 70 are illustrated. It will be appreciated that wheels 70 are inset within vehicle body 10 and prevent direct connection of driver-side upper rail 40, passenger-side upper rail 42, driver-side lower rail 50, and passenger-side lower rail 52 to vehicle body side members 11 with a straight structural member.

Figure 2:
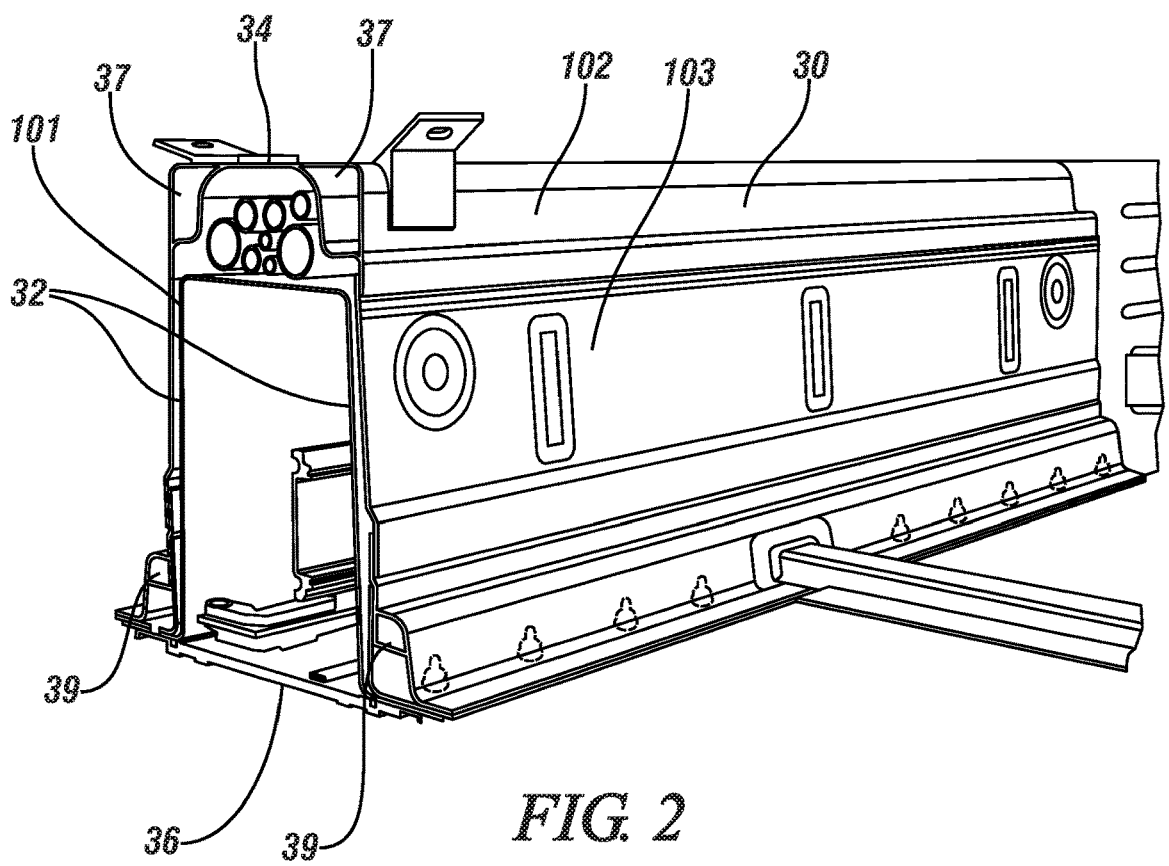
FIG. 2 illustrates in perspective view the single member torsional box of FIG. 1, in accordance with the present disclosure.

FIG. 2 illustrates in perspective view the single member torsional box of FIG. 1. Single member torsional box 30 is illustrated with a substantially rectangular cross-section including a top wall 34, two side walls 32, and a bottom panel 36. The rectangular cross-section is a closed shape, such that single member torsional box 30 can efficiently transfer force from diagonal support members 60 to rearward body components 80. Additionally, single member torsional box 30 is reinforced with four extruded enclosed sections, enclosed sections 37 on the top corners and enclosed sections 39 on the bottom corners, to add torsional rigidity to the single member torsional box 30, thereby imparting torsional strength to vehicle body 10.

Single member torsional box 30 can be a composite structure, including a plurality of pieces attached together to make up the overall single member. Single member torsional box 30 includes a central upside-down U-shaped portion 101, an upper upside-down U-shaped portion 102, two side plates 103, and bottom panel 36. Bottom panel 36 is attached to the rest of single member torsional box 30 with a plurality of fasteners attaching bottom panel 36 to single member torsional box 30. Single member torsional box 30 may include embedded or welded on clinch nuts configured to receive threaded fasteners to attach bottom panel 36 to the box.

Figure 3:
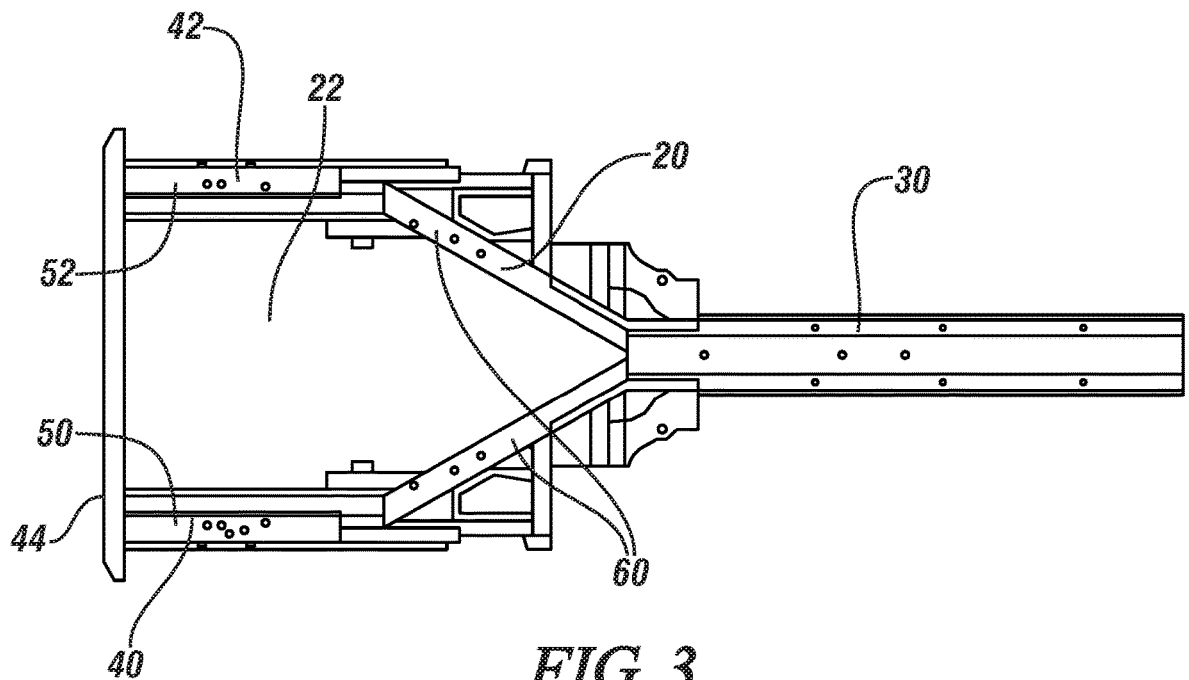
FIG. 3 illustrates in top view the close coupled four rail front crush structure system of FIG. 1, in accordance with the present disclosure.

FIG. 3 illustrates in top view the front crush structure system of FIG. 1. Front crush structure system 20 is illustrated including four rails including driver-side upper rail 40, passenger-side upper rail 42, driver-side lower rail 50, and passenger-side lower rail 52; diagonal support members 60; and single member torsional box 30. A horizontal member 44 is illustrated connecting driver-side upper rail 40 to passenger-side upper rail 42. Horizontal member 44 can be configured to receive a force and transmit that force to each of the connected rails.

By spacing out the driver-side and passenger side rails, force can be transmitted from across a wide front surface of the vehicle. If only a central rail were used, force applied to either side of the central rail could not be efficiently transferred. Additionally, by spacing out the driver-side and passenger side rails, a space 22 between the rails can be preserved, thereby preserving a cargo carrying capability for the vehicle body.

Figure 4:
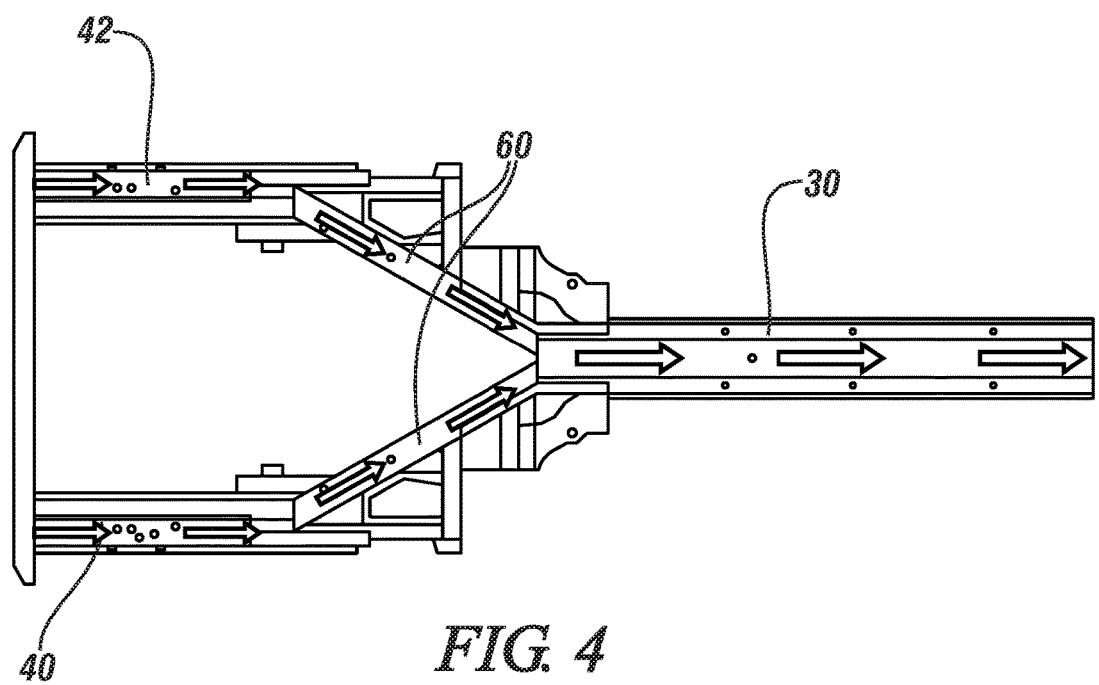
FIG. 4 illustrates the close coupled four rail front crush structure system of FIG. 3 with illustrative arrows showing exemplary force distribution through the members of the close coupled four rail front crush structure system, in accordance with the present disclosure.

FIG. 4 illustrates the front crush structure system of FIG. 3 with illustrative arrows showing exemplary force distribution through the members of the close coupled four rail front crush structure system. Single member torsional box 30, diagonal support members 60, and driver-side upper rail 40 and passenger-side upper rail 42 are illustrated. A frontal force is illustrated being transmitted through each of driver-side upper rail 40 and passenger-side upper rail 42.

Driver-side upper rail 40 and passenger-side upper rail 42 are illustrated substantially parallel to a longitudinal axis of the vehicle body. Diagonal support members 60 are each illustrated angled approximately 30 degrees in relation to driver-side upper rail 40 and passenger-side upper rail 42, respectively. Similarly, diagonal support member 60 are illustrated angled approximately 30 degrees in relation to single member torsional box 30. In an ideal situation, from a standpoint of efficient force transmission, one would want force to be transmitted through an ideal column that was perfectly in line from one end to another. However, for reasons of needing to transmit force across a wide front of the vehicle, cost, weight, cargo room, and other important considerations, driver-side upper rail 40 and passenger-side upper rail 42 need to be offset from single member torsional box 30. By maintaining a relatively small angle between driver-side upper rail 40 and passenger-side upper rail 42 and diagonal support members 60 and between diagonal support members 60 and single member torsional box 30, a majority of the force applied to driver-side upper rail 40 and passenger-side upper rail 42 can be transmitted efficiently to and through single member torsional box 30. An analysis of force vectors can be used to approximate that 86% of force applied to driver-side upper rail 40 is transferred to the connected diagonal support member 60, and similarly, approximately 86% of the force applied to diagonal support member 60 is transferred to the connected single member torsional box 30. It will be appreciated that a similar illustration from a bottom view showing force transmission through the lower rail members and the attached diagonal support members could be shown, and the illustrative arrows showing force transmission would be substantially the same as the arrows of FIG. 4.

Figure 5:
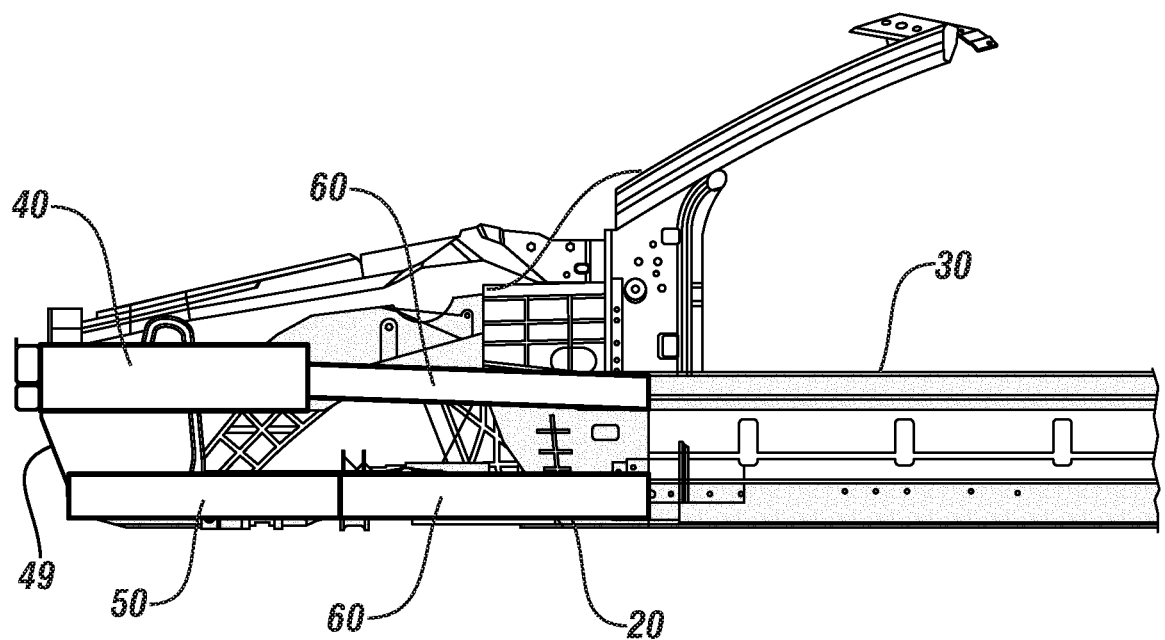
FIG. 5 illustrates in side view the close coupled four rail front crush structure system of FIG. 1, in accordance with the present disclosure.
Figure 6:
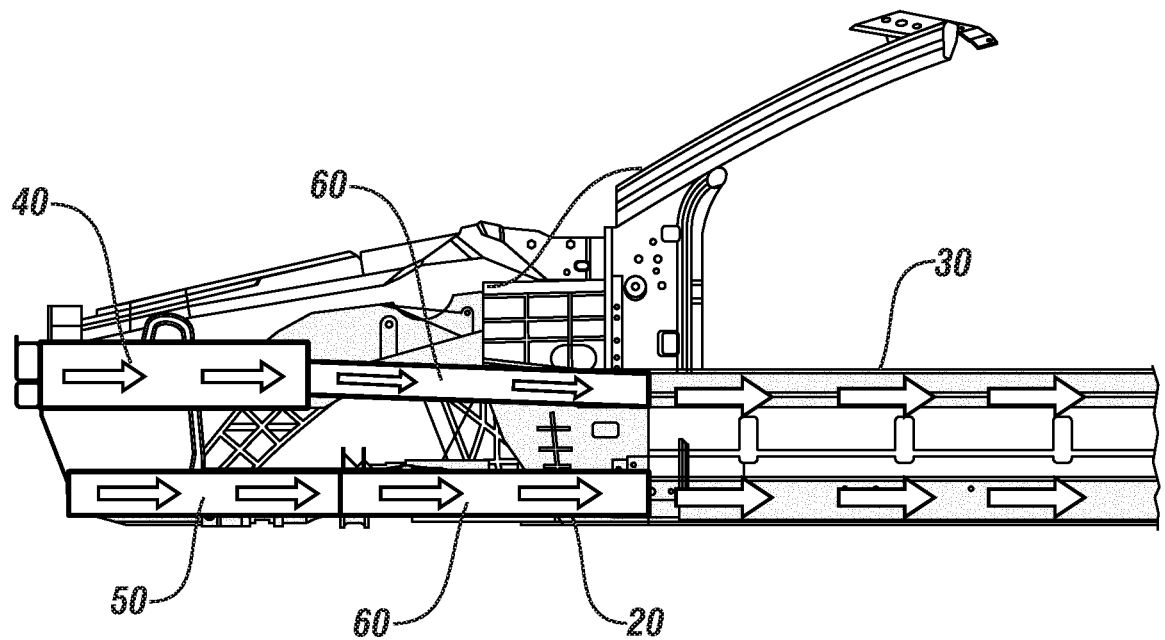
FIG. 6 illustrates the close coupled four rail front crush structure system of FIG. 5 with illustrative arrows showing exemplary force distribution through the members of the close coupled four rail front crush structure system, in accordance with the present disclosure.

FIG. 5 illustrates in side view the close coupled four rail front crush structure system of FIG. 1. Front crush structure system 20 is illustrated including driver-side upper rail 40, driver-side lower rail 50, diagonal support members 60, and single member torsional box 30. In one embodiment, driver-side upper rail 40, driver-side lower rail 50 can be die cast parts with complex shapes, for example, including attachment features for holding the rails in place within the vehicle body. Diagonal support members 60 can include tubular, extruded members which are inset, held within, or otherwise fastened to other parts. The components of front crush structure system 20 are illustrated in simplified blocks for clarity sake, showing force transmitting members as blocks to provide an understanding of how they are configured to transfer force. However, their actual appearance in the vehicle can vary from the illustrations provided herein. FIG. 6 illustrates the close coupled four rail front crush structure system of FIG. 5 with illustrative arrows showing exemplary force distribution through the members of the close coupled four rail front crush structure system. Front crush structure system 20 is illustrated including driver-side upper rail 40, driver-side lower rail 50, diagonal support members 60, and single member torsional box 30. By maintaining a relatively small angle between driver-side upper rail 40 and driver-side lower rail 50 and respective diagonal support members 60 and between diagonal support members 60 and single member torsional box 30, a majority of the force applied to driver-side upper rail 40 and driver-side lower rail 50 can be transmitted efficiently to and through single member torsional box 30. FIGS. 5 and 6 are illustrated from a driver-side view of the vehicle body. It will be appreciated that a similar illustration from a passenger-side view showing force transmission through the passenger-side rail members and the attached diagonal support members could be shown, and the illustrative arrows showing force transmission would be substantially the same as the arrows of FIG. 6.

Front crush structure system 20 can include one or more vertical braces 49, such that force applied to either the top rails or the bottom rails is distributed to the other rails.

Figure 7:
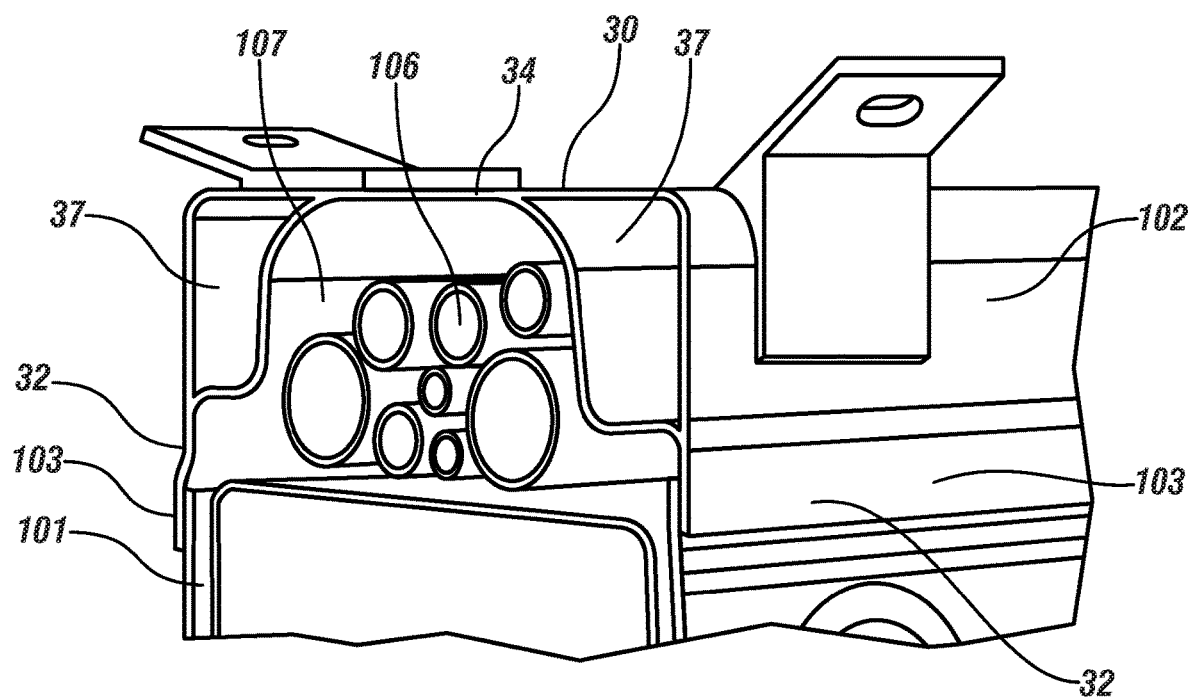
FIG. 7 illustrates a top portion of the single member torsional box of FIG. 2 in detail, in accordance with the present disclosure.

FIG. 7 illustrates a top portion of the single member torsional box of FIG. 2 in detail. Single member torsional box 30 is illustrated including a top wall 34, two side walls 32, and enclosed sections 37. Central upside-down U-shaped portion 101, upper upside-down U-shaped portion 102, two side plates 103 are illustrated forming the composite structure of the single member torsional box 30. Coolant lines 106 are illustrated positioned within a central cavity of single member torsional box 30.

Figure 8:
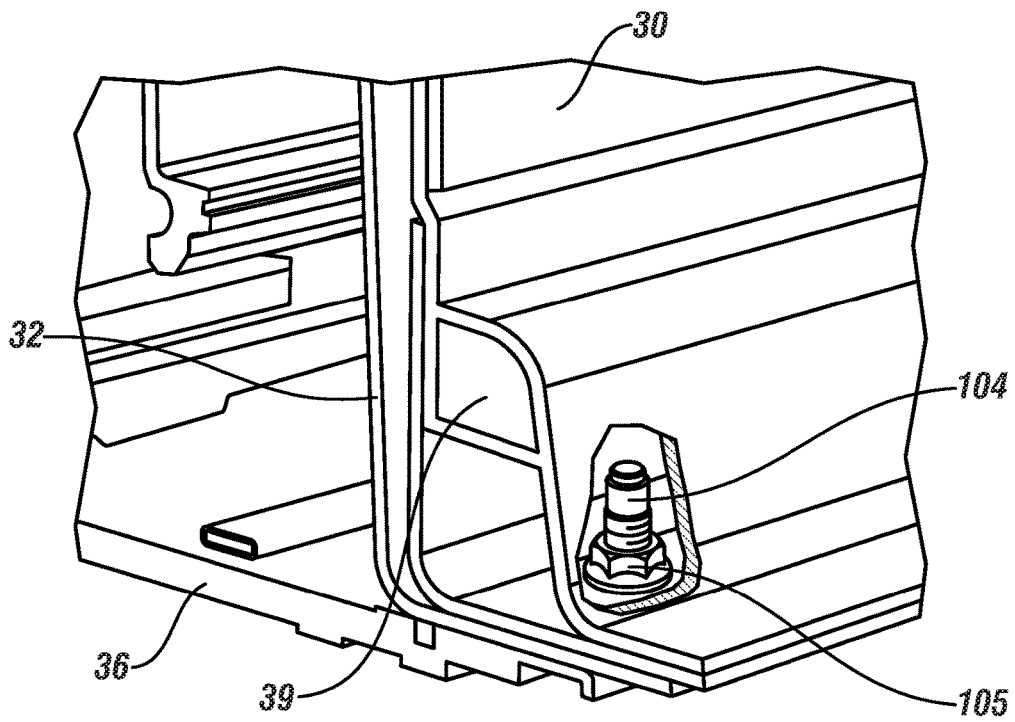
FIG. 8 illustrates a bottom portion of the single member torsional box of FIG. 2 in detail, in accordance with the present disclosure.

FIG. 8 illustrates a bottom portion of the single member torsional box of FIG. 2 in detail. Single member torsional box 30 is illustrated including a side wall 32, bottom panel 36, enclosed section 39, and a fastener 104 being attached to a clinch nut 105 attached to single member torsional box 30.

Figure 9:
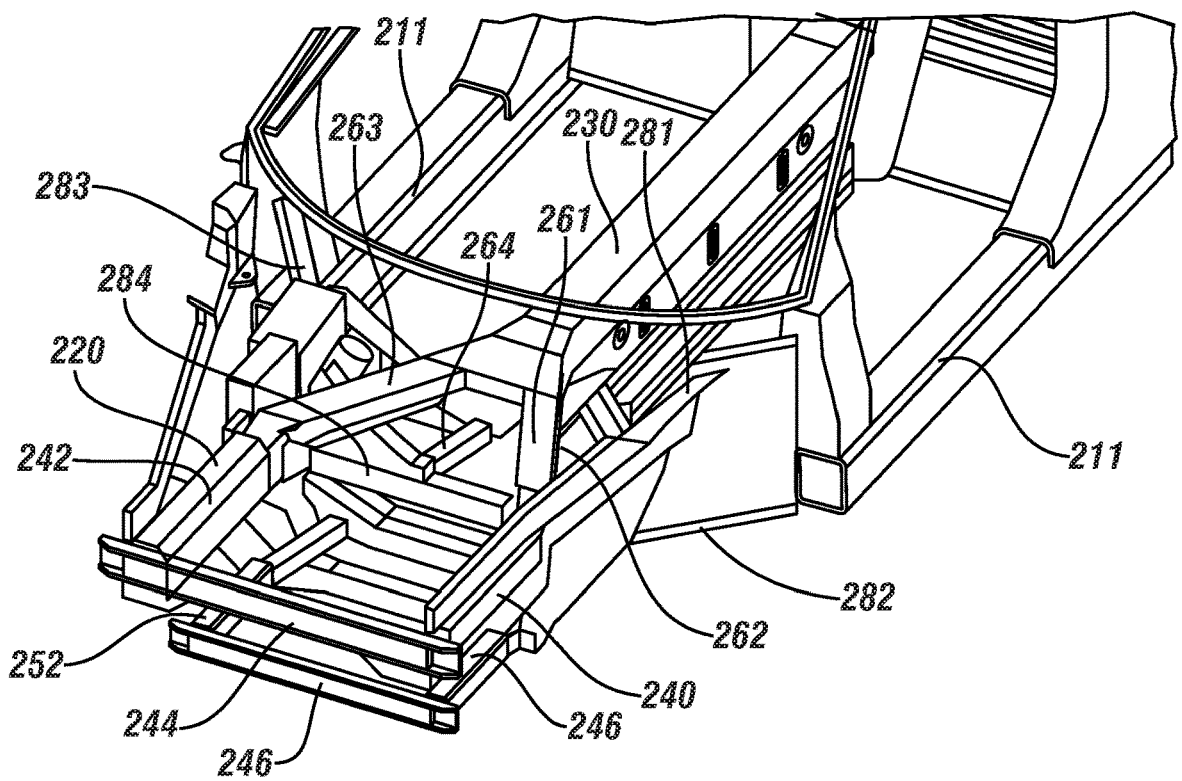
FIG. 9 illustrates in a top perspective view an alternative exemplary embodiment of a vehicle body including a four rail front crush structure system, including an eight element support structure disseminating force from the four rails to a mid-portion of the vehicle body, in accordance with the present disclosure.

FIG. 9 illustrates in a top perspective view an alternative exemplary embodiment of a vehicle body including a four rail front crush structure system, including an eight element support structure disseminating force from the four rails to a mid-portion of the vehicle body. Vehicle body 200 is illustrated including front crush structure system 220 connected to rearward body components. Front crush structure system 220 includes four rails including driver-side upper rail 240, passenger-side upper rail 242, driver-side lower rail 250, and passenger-side lower rail 252, and single member torsional box 230. Front crush structure system 220 further includes four inner diagonal support members, upper driver-side inner diagonal support member 261, lower driver-side inner diagonal support member 262, upper passenger-side inner diagonal support member 263, and lower passenger-side inner diagonal support member 264. Front crush structure system 220 further includes four outer diagonal support members, upper driver-side outer diagonal support member 281, lower driver-side outer diagonal support member 282, upper passenger-side outer diagonal support member 283, and lower passenger-side outer diagonal support member 284.

Each of driver-side upper rail 240, passenger-side upper rail 242, driver-side lower rail 250, and passenger-side lower rail 252 are parallel to a longitudinal axis of vehicle body 200, such that external force applied to a front of vehicle body 200 can be transmitted through driver-side upper rail 240, passenger-side upper rail 242, driver-side lower rail 250, and passenger-side lower rail 252 in a vehicle rearward direction. Each of driver-side upper rail 240, passenger-side upper rail 242, driver-side lower rail 250, and passenger-side lower rail 252 can be constructed of low strength aluminum, such that the rails can crush and absorb force.

Single member torsional box 230 is illustrated in a central portion of vehicle body 200 corresponding to a passenger compartment of vehicle body 200. Upper driver-side inner diagonal support member 261 is illustrated connected to driver-side upper rail 240. Lower driver-side inner diagonal support member 262 is illustrated connected to driver-side lower rail 250. Upper passenger-side inner diagonal support member 263 is illustrated connected to passenger-side upper rail 242. Lower passenger-side inner diagonal support member 264 is illustrated connected to passenger-side lower rail 252. Each inner diagonal support member is attached to a corner of single member torsional box 230.

As is illustrated in FIG. 1, wheels can be present in an area proximate to a vehicle body and interrupt a desirable location to place a support member useful to disseminate force within a vehicle body. Without a wheel being situated in the way, one would want outer diagonal support members to connect to the four front rails as the inner diagonal support members of FIG. 9 do. However, in some vehicle configurations, the wheel location prevents such a support member location. Upper driver-side outer diagonal support member 281, lower driver-side outer diagonal support member 282, upper passenger-side outer diagonal support member 283, and lower passenger-side outer diagonal support member 284 of FIG. 9 are illustrated connecting with vehicle body components in vehicle rearward positions relative to the corresponding connections between the four front rails and the four inner diagonal support members. This rearward displacement of the outer diagonal support members enables a desired placement of the wheels of the vehicle as illustrated in FIG. 1, while still permitting force to be disseminated to outer portions of the vehicle such as vehicle body side members 211.

Upper driver-side outer diagonal support member 281, lower driver-side outer diagonal support member 282, upper passenger-side outer diagonal support member 283, and lower passenger-side outer diagonal support member 284 may, in one embodiment, each extend inwardly to come into contact with a corresponding one of upper driver-side inner diagonal support member 261, lower driver-side inner diagonal support member 262, upper passenger-side inner diagonal support member 263, and lower passenger-side inner diagonal support member 264. In another embodiment, brackets and/or connecting members may be situated between ends of each of upper driver-side outer diagonal support member 281, lower driver-side outer diagonal support member 282, upper passenger-side outer diagonal support member 283, and lower passenger-side outer diagonal support member 284 and corresponding inner diagonal support members to transfer force between the various members.

Figure 10:
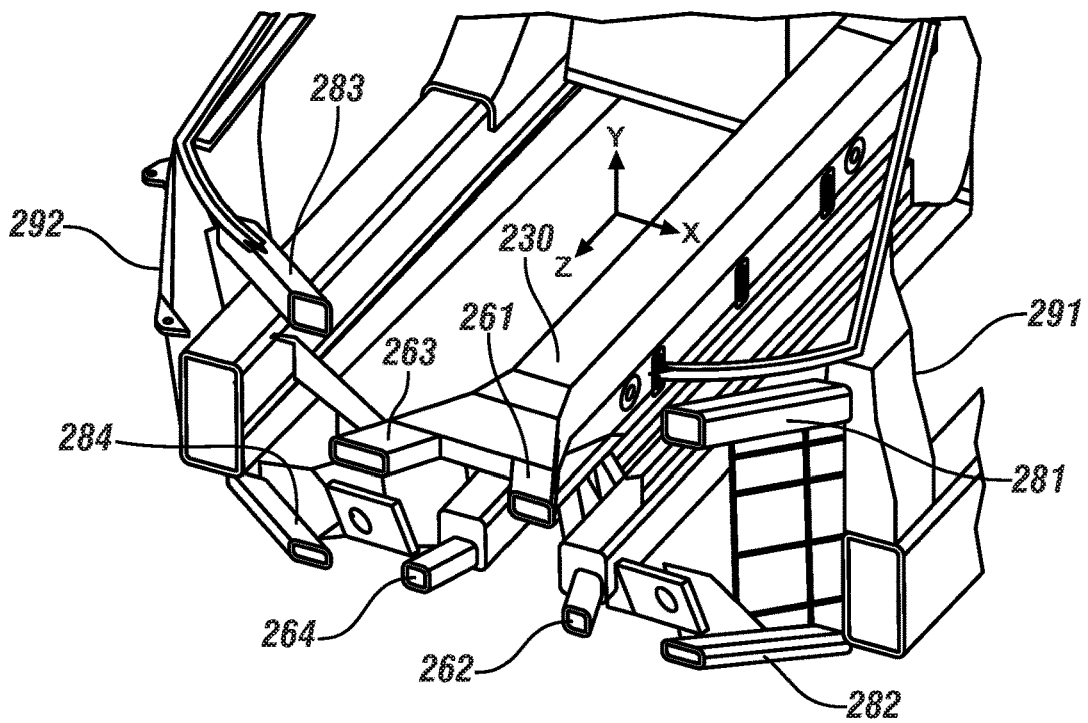
FIG. 10 illustrates the four rail front crush structure system of FIG. 9 in cut-away view, illustrating each of the eight elements of the eight element support structure, in accordance with the present disclosure.

FIG. 10 illustrates the four rail front crush structure system of FIG. 9 in cut-away view, illustrating each of the eight elements of the eight element support structure. Portions of each of upper driver-side inner diagonal support member 261, lower driver-side inner diagonal support member 262, upper passenger-side inner diagonal support member 263, and lower passenger-side inner diagonal support member 264 are illustrated connecting with single member torsional box 230. Portions of upper driver-side outer diagonal support member 281 and lower driver-side outer diagonal support member 282 are illustrated attached to vehicle body member 291. Portions of upper passenger-side outer diagonal support member 283 and lower passenger-side outer diagonal support member 284 are illustrated attached to vehicle body member 292.

Figure 11:
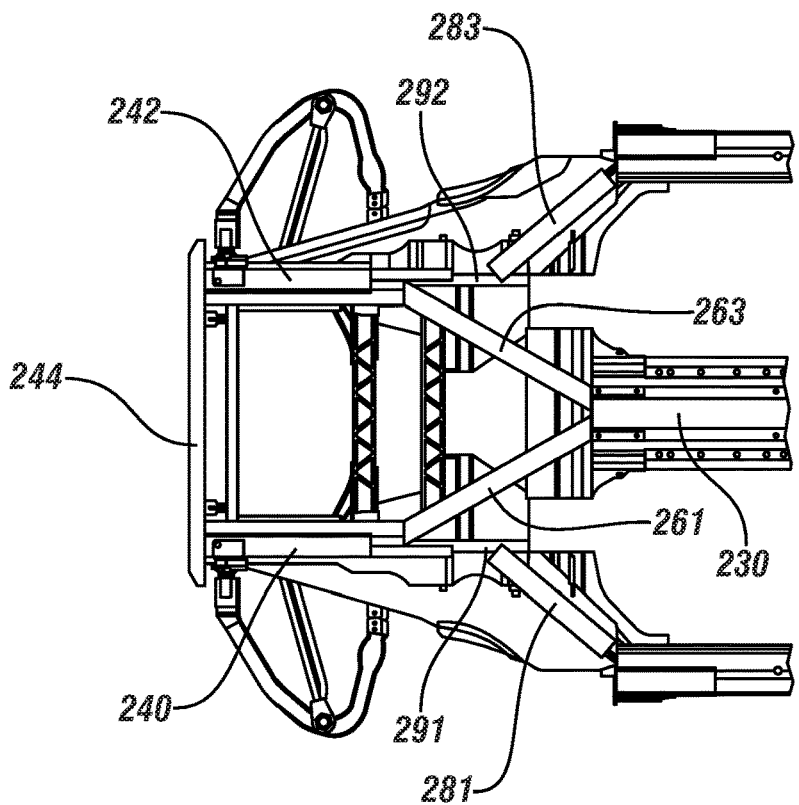
FIG. 11 illustrates the four rail front crush structure system of FIG. 9 in top view, in accordance with the present disclosure.

FIG. 11 illustrates the four rail front crush structure system of FIG. 9 in top view. Driver-side upper rail 240 and passenger-side upper rail 242 are illustrated connected by horizontal member 244. Upper driver-side inner diagonal support member 261 is illustrated connected to both driver-side upper rail 240 and single member torsional box 230. Upper passenger-side inner diagonal support member 263 is illustrated connected to both passenger-side upper rail 242 and single member torsional box 230. Vehicle body member 291 is illustrated positioned between and configured to transfer force between upper driver-side inner diagonal support member 261 and upper driver-side outer diagonal support member 281. Vehicle body member 292 is illustrated positioned between and configured to transfer force between upper passenger-side inner diagonal support member 263 and upper passenger-side outer diagonal support member 283.

By spacing out the driver-side and passenger side rails, force can be transmitted from across a wide front surface of the vehicle. If only a central rail were used, force applied to either side of the central rail could not be efficiently transferred. Additionally, by spacing out the driver-side and passenger side rails, a space between the rails can be preserved, thereby preserving a cargo carrying capability for the vehicle body.

Figure 12:
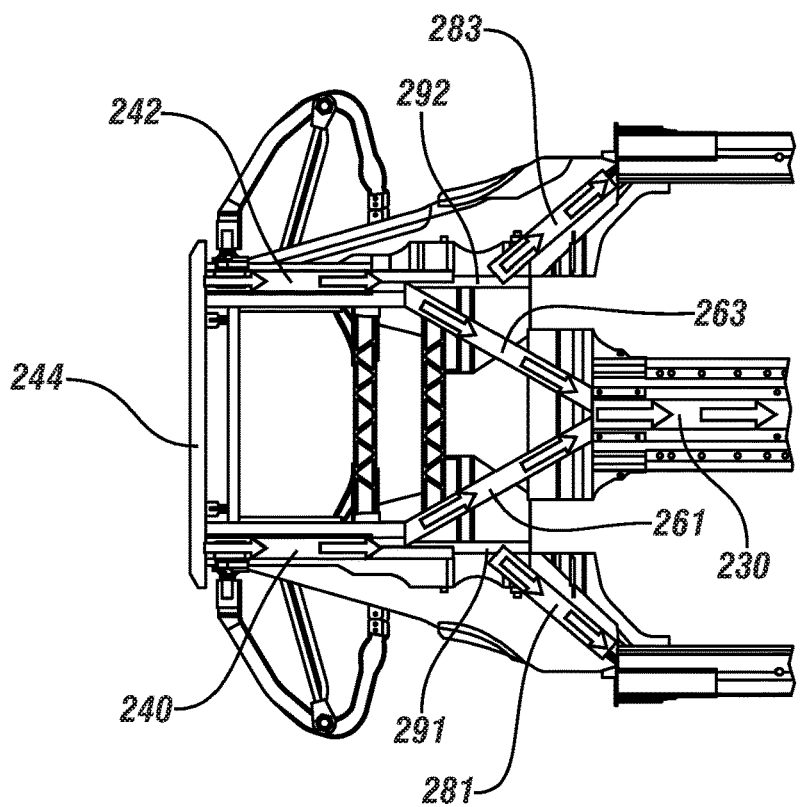
FIG. 12 illustrates the four rail front crush structure system of FIG. 11, with illustrative arrows showing exemplary force distribution through the members of the four rail front crush structure system, in accordance with the present disclosure.

FIG. 12 illustrates the four rail front crush structure system of FIG. 11, with illustrative arrows showing exemplary force distribution through the members of the four rail front crush structure system. Single member torsional box 230, inner diagonal support members, and outer diagonal support members are illustrated. A frontal force is illustrated being transmitted through each of driver-side upper rail 240 and passenger-side upper rail 242.

Driver-side upper rail 240 and passenger-side upper rail 242 are illustrated substantially parallel to a longitudinal axis of the vehicle body. Upper driver-side inner diagonal support member 261 is illustrated connected to both driver-side upper rail 240 and single member torsional box 230, with approximate 30 degree angle connections to both driver-side upper rail 240 and single member torsional box 230. Upper passenger-side inner diagonal support member 263 is illustrated connected to both passenger-side upper rail 242 and single member torsional box 230, with approximate 30 degree angle connections to both passenger-side upper rail 242 and single member torsional box 230. A portion of the force applied to driver-side upper rail 240 is transferred to upper driver-side inner diagonal support member 261. Another portion of the force applied to driver-side upper rail 240 is transferred to upper driver-side outer diagonal support member 281 through vehicle body member 291. It will be appreciated that a similar illustration from a bottom view showing force transmission through the lower rail members and the attached diagonal support members could be shown, and the illustrative arrows showing force transmission would be substantially the same as the arrows of FIG. 12. In this way, frontal force applied to the rail members is disseminated both through single member torsional box 230 and vehicle body side members by the eight diagonal support members.

Figure 13:
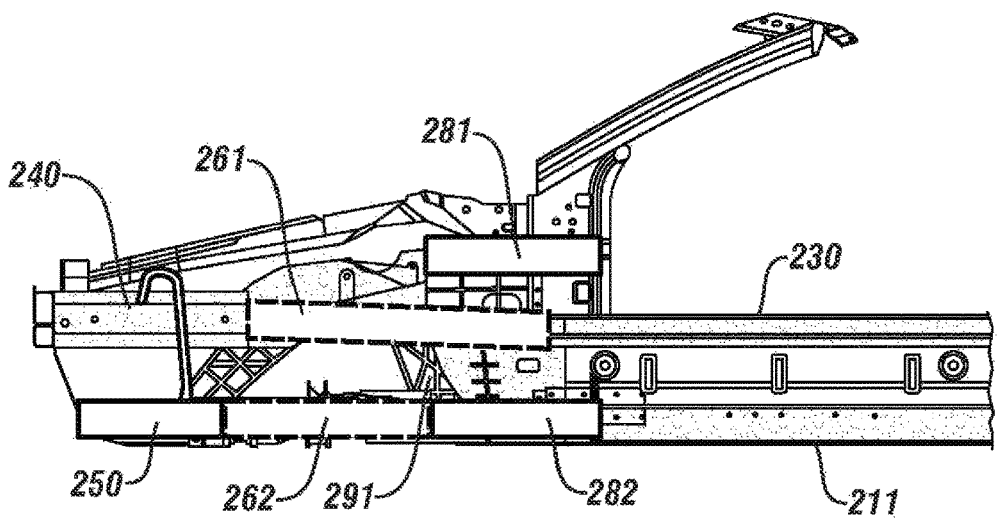
FIG. 13 illustrates the four rail front crush structure system of FIG. 9 in side view, in accordance with the present disclosure.

FIG. 13 illustrates the four rail front crush structure system of FIG. 9 in side view. Driver-side upper rail 240 and driver-side lower rail 250 are illustrated. Upper driver-side inner diagonal support member 261 is illustrated connected to both driver-side upper rail 240 and single member torsional box 230. Lower driver-side inner diagonal support member 262 is illustrated connected to both driver-side lower rail 250 and single member torsional box 230. Vehicle body member 291 is illustrated positioned between and configured to transfer force between upper driver-side inner diagonal support member 261 and upper driver-side outer diagonal support member 281. Upper driver-side outer diagonal support member 281 is illustrated positioned to transfer force between vehicle body member 291 and vehicle body side member 211. Lower driver-side outer diagonal support member 282 is illustrated positioned to transfer force between lower-driver-side inner diagonal support member 262 and vehicle body side member 211.

Figure 14:
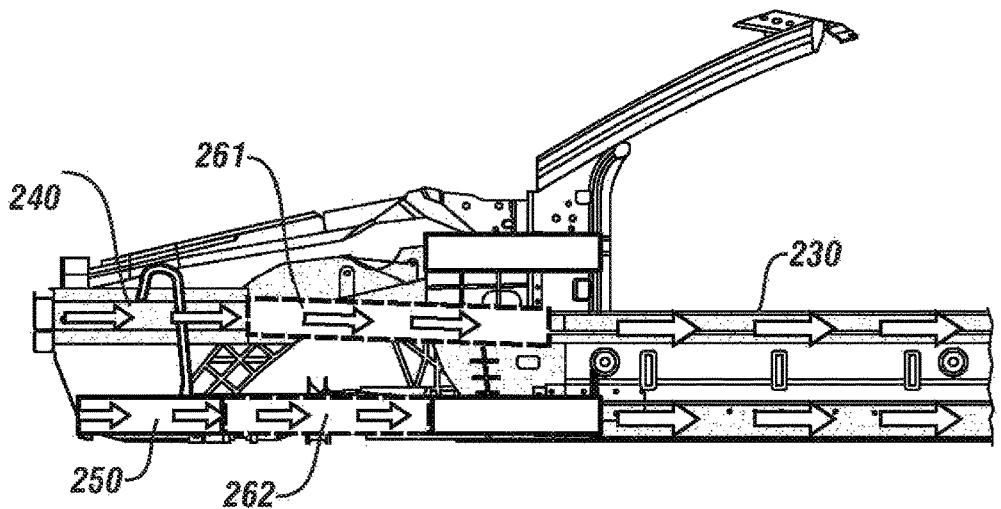
FIG. 14 illustrates the four rail front crush structure system of FIG. 13, with the two driver-side outer diagonal support members removed for illustrative purposes, with illustrative arrows showing exemplary force distribution through the members of the four rail front crush structure system, in accordance with the present disclosure.

FIG. 14 illustrates the four rail front crush structure system of FIG. 13, with the two driver-side outer support members removed for illustrative purposes, with illustrative arrows showing exemplary force distribution through the members of the four rail front crush structure system. The front crush structure system is illustrated including driver-side upper rail 240, driver-side lower rail 250, upper driver-side inner diagonal support member 261, lower driver-side inner diagonal support member 262 and single member torsional box 230. By maintaining a relatively small angle between driver-side upper rail 240 and driver-side lower rail 250 and respective inner diagonal support members and between the inner diagonal support members and single member torsional box 230, force applied to driver-side upper rail 240 and driver-side lower rail 250 can be transmitted efficiently to and through single member torsional box 230.

Figure 15:
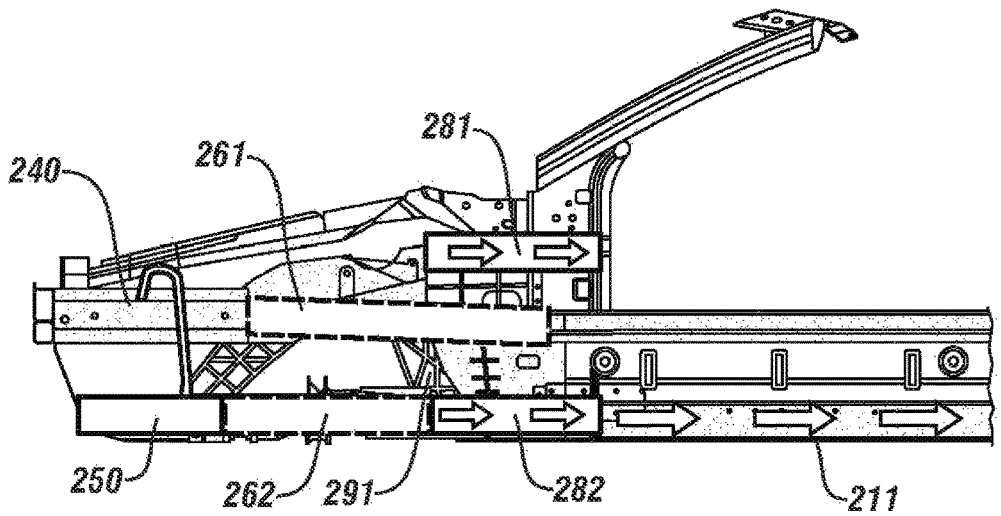
FIG. 15 illustrates the four rail front crush structure system of FIG. 13, with illustrative arrows showing exemplary force distribution through the two driver-side outer diagonal support members and the attached vehicle body side member, in accordance with the present disclosure.

FIG. 15 illustrates the four rail front crush structure system of FIG. 13, with illustrative arrows showing exemplary force distribution through the two driver-side outer diagonal support members and the attached vehicle body side member. The front crush structure system is illustrated including driver-side upper rail 240, driver-side lower rail 250, upper driver-side inner diagonal support member 261, lower driver-side inner diagonal support member 262, upper driver-side outer diagonal support member 281, lower driver-side outer diagonal support member 282, vehicle body member 291, and vehicle body side member 211. As is illustrated in FIG. 14, force is transmitted through driver-side upper rail 240, driver-side lower rail 250, upper driver-side inner diagonal support member 261, and lower driver-side inner diagonal support member 262 from a front of the vehicle to a mid-portion of the vehicle. Additionally, a portion of the force from driver-side upper rail 240 and from driver-side lower rail 250 is transmitted to vehicle body side member 211 through upper driver-side outer diagonal support member 281 and lower driver-side outer diagonal support member 282, as is illustrated by the illustrative arrows in FIG. 15. In some embodiments, upper driver-side outer diagonal support member 281 and lower driver-side outer diagonal support member 282 can be directly connected to driver-side upper rail 240 and driver-side lower rail 250. In other embodiment, such as is described herein, where a wheel is positioned such that a direct connection of the rails and the outer diagonal support members, the outer diagonal support members can be connected to the inner diagonal support members or to vehicle body member 291, which can receive force from the rails, the inner diagonal support members, or both. FIGS. 13-15 are illustrated from a driver-side view of the vehicle body. It will be appreciated that a similar illustration from a passenger-side view showing force transmission through the passenger-side rail members and the attached diagonal support members could be shown, and the illustrative arrows showing force transmission would be substantially the same as the arrows of FIGS. 14 and 15.

Figure 16:
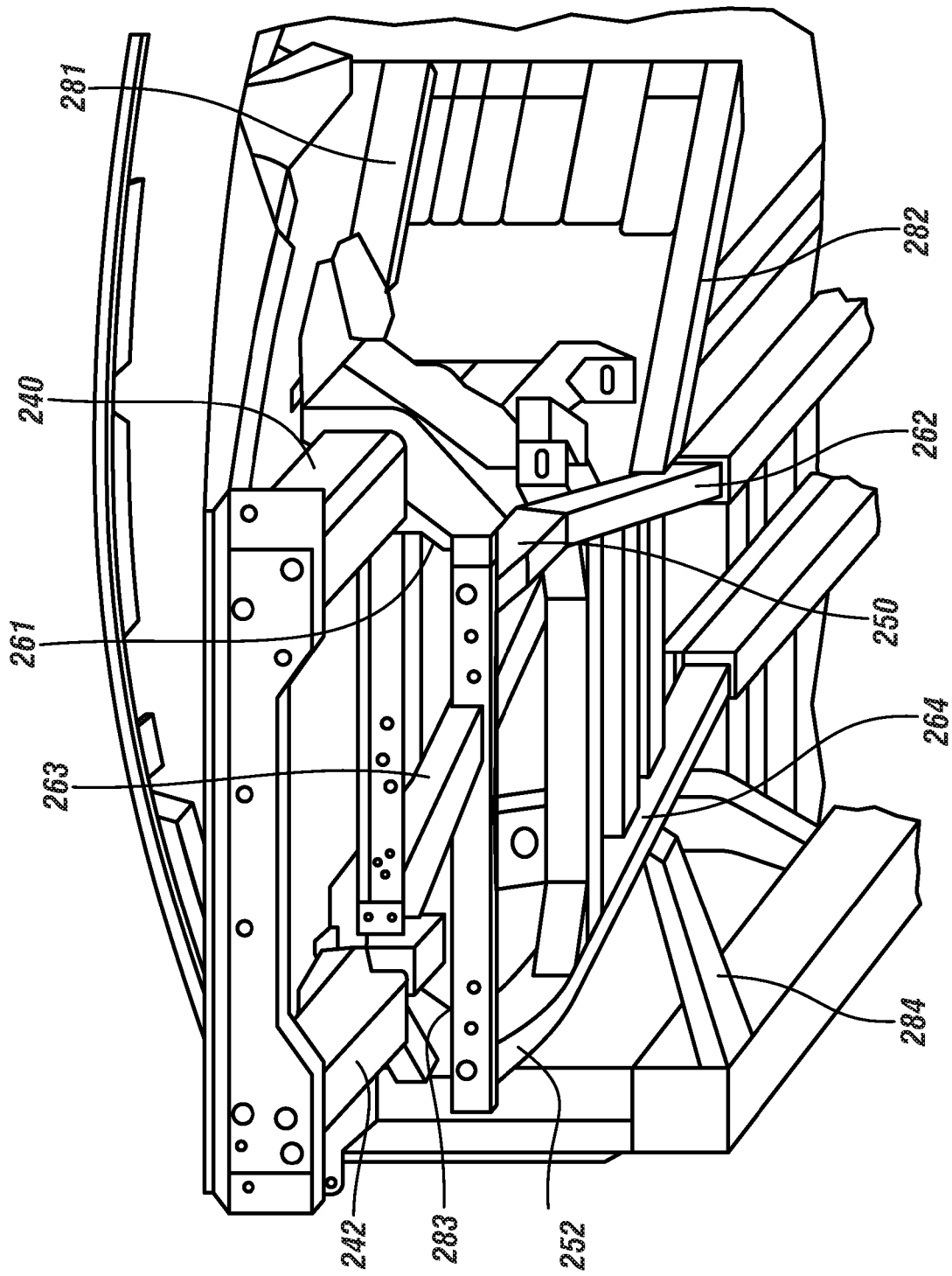
FIG. 16 illustrates the four rail front crush structure system of FIG. 9 in a bottom perspective view, in accordance with the present disclosure.

FIG. 16 illustrates the four rail front crush structure system of FIG. 9 in bottom perspective view. The vehicle body is illustrated including the front crush structure system. The front crush structure system includes four rails including driver-side upper rail 240, passenger-side upper rail 242, driver-side lower rail 250, and passenger-side lower rail 252, and single member torsional box 230. The Front crush structure system further includes four inner diagonal support members, upper driver-side inner diagonal support member 261, lower driver-side inner diagonal support member 262, upper passenger-side inner diagonal support member 263, and lower passenger-side inner diagonal support member 264. The front crush structure system further includes four outer diagonal support members, upper driver-side outer diagonal support member 281, lower driver-side outer diagonal support member 282, upper passenger-side outer diagonal support member 283, and lower passenger-side outer diagonal support member 284.

In one embodiment, the four outer diagonal support members may be each constructed with aluminum of relatively higher strength than the relatively low strength aluminum of the four rails and of relatively lower strength than the relatively high strength aluminum of the four inner diagonal support members.

For the purposes of the disclosure, the terms driver-side and passenger-side refer to standards for a left-hand-drive vehicle. Wherein the vehicle is instead a right-hand-drive vehicle, the terms can be used to refer to opposite sides of the vehicle with respect to the present disclosure.

While the best modes for carrying out the disclosure have been described in detail, those familiar with the art to which this disclosure relates will recognize various alternative designs and embodiments for practicing the disclosure within the scope of the appended claims.

What is claimed is:

1. A system for providing structural transmittal of force through a vehicle body of a mid-engine vehicle, comprising:
   an elongated single member torsional box spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body;
   two vehicle body side members parallel to the longitudinal axis of the vehicle body and spanning an outer lateral edge of the passenger compartment from the vehicle-forward portion of the passenger compartment to the vehicle-rearward portion of the passenger compartment;
   four rails in a vehicle-forward position relative to the elongated single member torsional box, parallel to the longitudinal axis of the vehicle body, and offset from the elongated single member torsional box; and
   eight diagonal support members, comprising:
      four inner diagonal support members, each inner diagonal support member being connected at a respective first end to a respective one of the four rails and on a respective second end to the elongated single member torsional box and being configured to transmit force from the one of the four rails to the elongated single member torsional box; and
      four outer diagonal support members, each outer diagonal support member being configured to transmit force to a respective one of the vehicle body side members.

2. The system of claim 1, wherein the four rails are each constructed with a relatively low strength aluminum; and
   wherein the four inner diagonal support members are each constructed with a relatively high strength aluminum.

3. The system of claim 2, wherein the four outer diagonal support members are each constructed with aluminum of relatively higher strength than the relatively low strength aluminum of the four rails and of relatively lower strength than the relatively high strength aluminum of the four inner diagonal support members.

4. The system of claim 1, wherein the elongated single member torsional box comprises a constant cross section along a longitudinal axis of the elongated single member torsional box.

5. The system of claim 1, wherein the inner diagonal support members are each oriented thirty degrees from the longitudinal axis of the vehicle body.

6. The system of claim 1, wherein the elongated single member torsional box comprises four corners; and
   wherein the inner diagonal support members are each connected at the respective second end to a respective one of the corners of the elongated single member torsional box.

7. The system of claim 6, wherein each of the corners of the elongated single member elongated box comprises a respective elongated enclosed section running along an entire length of the elongated single member torsional box.

8. The system of claim 1, wherein the outer diagonal support members are each connected to one of the four rails.

9. The system of claim 1, wherein at least one the outer diagonal support members is connected to a respective one of the inner diagonal support members in a vehicle-rearward location as compared to the first end of the inner diagonal support member.

10. The system of claim 9, wherein each of the outer diagonal support members is connected to a respective one of the inner diagonal support members in a vehicle-rearward location as compared to the first end of the inner diagonal support member.

11. The system of claim 1, further comprising vehicle body members positioned between the inner diagonal support members and the outer diagonal support members; and
   wherein force is transmitted from the inner diagonal support members to the outer diagonal support members through the vehicle body members.

12. A system for providing structural transmittal of force through a vehicle body of a mid-engine vehicle, comprising:
   an elongated single member torsional box comprising four corners and spanning a passenger compartment from a vehicle-forward portion of the passenger compartment to a vehicle-rearward portion of the passenger compartment, parallel to a longitudinal axis of the vehicle body, and laterally centered upon a longitudinal centerline of the vehicle body;
   two vehicle body side members parallel to the longitudinal axis of the vehicle body and spanning a respective outer lateral edge of the passenger compartment from the vehicle-forward portion of the passenger compartment to the vehicle-rearward portion of the passenger compartment;
   four rails in a vehicle-forward position relative to the elongated single member torsional box, parallel to the longitudinal axis of the vehicle body, and offset from the elongated single member torsional box; and
   eight diagonal support members, comprising:
      four inner diagonal support members, each inner diagonal support member being connected at a respective first end to a respective one of the four rails and on a respective second end to the elongated single member torsional box and being configured to transmit force from the one of the four rails to the elongated single member torsional box; and
      four outer diagonal support members, each outer diagonal support member being configured to transmit force to a respective one of the vehicle body side members;
   wherein the inner diagonal support members are each connected at the respective second end to a respective one of the corners of the elongated single member torsional box; and
   wherein each of the corners of the elongated single member elongated box comprises a respective elongated enclosed section running an entire length of the single member torsional box.

13. The system of claim 12, wherein at least one the outer diagonal support members is connected to one of the inner diagonal support members in a vehicle-rearward location as compared to the first end of the inner diagonal support member.

14. The system of claim 13, wherein each of the outer diagonal support members is connected to a respective one of the inner diagonal support members in a vehicle-rearward location as compared to the first end of the inner diagonal support member.

15. A method for providing structural transmittal of a frontal force through a vehicle body of a mid-engine vehicle, comprising:
receiving the frontal force to four rails in a vehicle-forward position, the rails being oriented parallel to a longitudinal axis of the vehicle body;
transmitting the frontal force from the four rails to four inner diagonal support members located in a vehicle rearward position relative to the four rails, each of the inner diagonal support members being connected at a respective first end to a respective one of the four rails and at a respective second end to an elongated single member torsional box, and additionally to four outer diagonal support members, each of the outer diagonal support members being configured to transfer force to a vehicle body side member parallel to the longitudinal axis of the vehicle body and spanning an outer lateral edge of a passenger compartment from a vehicle-forward portion of the passenger compartment to a vehicle-rearward portion of the passenger compartment; and
transmitting the frontal force from the four inner diagonal support members to the elongated single member torsional box located in a vehicle rearward position relative to the four diagonal support members, the elongated single member torsional box spanning a passenger compartment from a vehicle-forward portion of the passenger compartment to a vehicle-rearward portion of the passenger compartment and being parallel to the longitudinal axis of the vehicle body and laterally centered upon a longitudinal centerline of the vehicle body.

16. The method of claim 15, further comprising connecting the four rails in the vehicle-forward position with horizontal members and at least one vertical brace to distribute the frontal force over the four rails.

* * * * *